R. H. ROYCE.
BUSHING.
APPLICATION FILED OCT. 12, 1917.
1,298,100.
Patented Mar. 25, 1919.
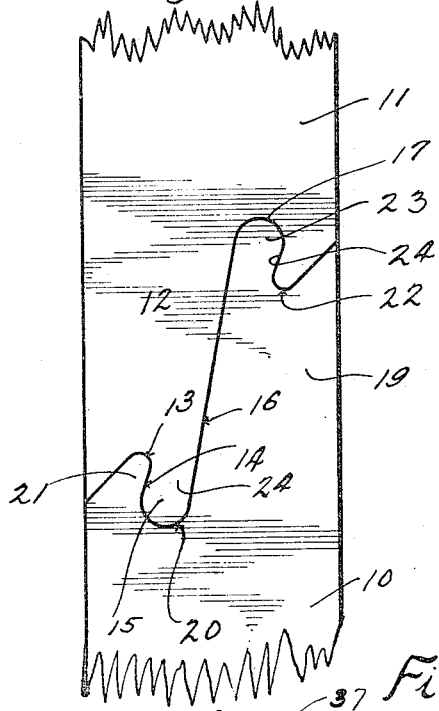
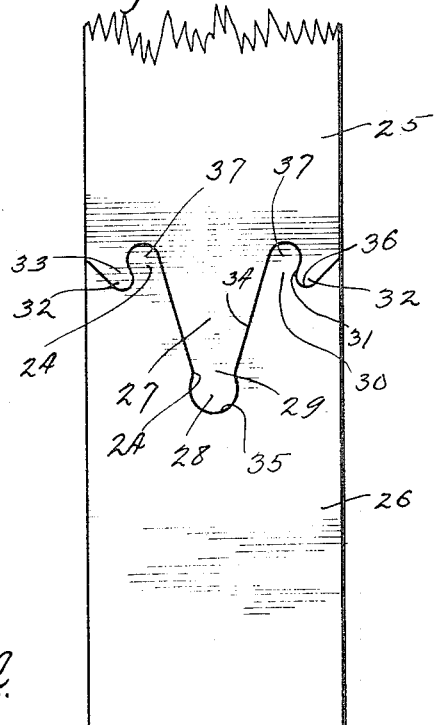
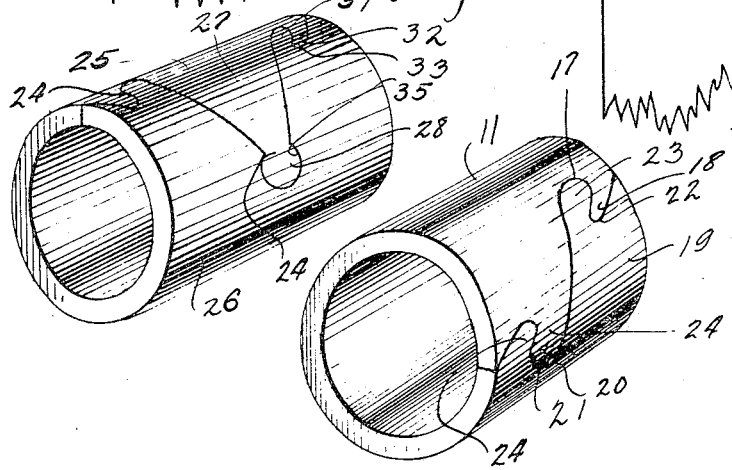
WITNESSES M. A. Royce
F. A. Underwood ATTORNEY
INVENTOR Rowland H. Royce.

UNITED STATES PATENT OFFICE.

ROWLAND H. ROYCE, OF HARTFORD, CONNECTICUT.

BUSHING.

1,298,100.  Specification of Letters Patent.  Patented Mar. 25, 1919.

Application filed October 12, 1917. Serial No. 196,261.

*To all whom it may concern:*

Be it known that I, ROWLAND H. ROYCE, a citizen of the United States, residing at Hartford, in the county of Hartford, State of Connecticut, have invented certain new and useful Improvements in Bushings; and I do hereby declare the following to be a full, clear, and exact description of the invention, such as will enable others skilled in the art to which it appertains to make and use the same.

This invention relates to improvements in bushings and rolls, and particularly to bushings and rolls adapted for use in connection with roller chains.

One object of the present invention is to provide a device of this character which is simple in construction and which can be manufactured at a much lower cost than similar devices heretofore, and with much less time and labor.

Another object is to provide a bushing or roll which can be quickly and easily applied to the part where used and which can be easily and quickly removed or replaced with a new one.

Other objects and advantages will be apparent from the following description when taken in connection with the accompanying drawing.

In the drawing:

Figure 1 is a plan view of portions of a bushing or roll made in accordance with my invention showing the locking joint of the ends of the bushing or roll in engaged position.

Fig. 2 is a similar view of a modified form of interlocking joint for a bushing or roll.

Fig. 3 is a perspective view of a completed bushing or roll made in accordance with the form of Fig. 1.

Fig. 4 is a perspective view of a completed bushing or roll made in accordance with the form of Fig. 2.

Referring particularly to the accompanying drawing and especially to Fig. 1, 10 and 11 represent the ends of the strip of metal which is of the desired width and thickness.

One end of the strip is formed with a longitudinally extending tapering member 12 in the outer end of which there is formed an oblique recess 13 the entrance throat 14 of which is slightly narrower than the inner and outer portions of the recess. Laterally inward from the recess there is formed a partly circular tab 15, and extending from the inner side of the tab to a suitable distance longitudinally of the strip, and traversing the longitudinal median line thereof is an oblique wall or edge 16. At the inner end of this wall or edge there is formed a recess 17 similar to the recess 13 but of greater diameter. A partly circular tab 18 is formed at the outer side of the recess 17, said tab inclining inwardly toward the longitudinal median line of the strip.

At the opposite end of the strip there is formed a similar tapering member 19 but disposed on the opposite side of the longitudinal median line of the strip, and having its inner inclined wall disposed in a plane parallel with the corresponding wall of the member 12. At the inner end of the member 19 there is formed a recess 20, and a tab 21 similar in size and shape to the corresponding recess and tab at the other end of the strip. At the outer end of the member 19 there are formed the recess 22 and tab 23 of a size and shape corresponding to those at the end of the first tapering member 12.

In using the device the strip is drawn into cylindrical shape, as seen in Fig. 3, so that the ends interlock. The tabs 15 and 23 are received in the recesses 20 and 17 respectively, while the tabs 18 and 21 are received in the recesses 22 and 13 respectively. The edge 16 of the member 12 abuts the corresponding edge of the member 19, as will be readily understood from an inspection of the drawing, and upon special reference to Fig. 3.

It will be noted that all of the tabs have the narrow necks 24 which fit into the narrow throats of the respective recesses and thus firmly hold the tabs from slipping from said recesses.

With this structure, it will be seen that the portion of the sheet of metal from which each end of the strip is cut will form the reversal of the end of another strip, and that it is only necessary to turn the strip over to correspond to the first strip mentioned.

Referring now to Fig. 2, there is shown a modified form of the locking means for the ends of the strip. In this view the strip ends are represented by the reference characters 25 and 26, respectively. Formed centrally on the end 25, and extending longitudinally therefrom, is an outwardly tapering tab 27, and on the outer end of this tab there is formed a partly circular portion 28, connected to the tab by the neck portion 29. At each side of the base of the tab 27 there is formed an outwardly inclined recess 30 having a narrow neck portion 31, and outwardly of each of the recesses there is formed the inwardly inclined partly circular tab 32 having the neck portion 33.

On the end 26 there is formed the inwardly extending V-shaped recess 34, at the inner or apex end of which there is formed the partly circular and smaller recess 35, the former of which receives the major portion of the tab 27, while the inner recess 35 receives the member 28 of the said tab. At opposite sides of the mouth of the V-shaped recess 34 there are formed the outwardly inclining recesses 36 which receive the tabs 32, while the tabs 37, formed inwardly of the recesses 36, are received in the recesses 30 of the end 25. Thus there is produced a firm and effective interlocking joint between the ends of the strip when said strip is rolled into cylindrical or tubular form.

Ordinarily the rollers or bushings used on roller chains are formed from a single round bar of metal which must be drilled, reamed, chamfered, and cut into proper lengths. This requires considerable time and labor, as well as increasing the cost of the manufacture. With the present device large numbers of the blanks can be stamped out of a sheet of suitable metal, at a single operation and without material waste, and then rolled into the proper shape with the ends in interlocking relation.

Attention is called to the fact that I have illustrated two forms of locking means for the ends of the strips forming the bushings or rolls, but I wish it understood that I do not confine my invention to the particular form or the interlocking means but to the general structure of the bushing or roller whereby said bushing or roller can be manufactured and sold at a lower figure than similar devices heretofore and that the device can be applied or removed with relation to the mechanism with which it is used, without any great time or labor.

What is claimed is:

1. A bushing formed from a sheet of metal rolled into tubular form and having its engaging edges formed with outwardly tapering tongues, said tongues being formed with terminal enlargements.

2. A bushing formed from a sheet of metal rolled into tubular form and having its engaging ends formed with longitudinally tapering and interlocking tongues, said tongues having their terminals formed with transversely widened auxiliary tongues.

In testimony whereof, I affix my signature in the presence of two witnesses.

ROWLAND H. ROYCE.

Witnesses:
FRANK A. UNDERWOOD,
JENNIE E. UNDERWOOD.